US012780335B2

(12) United States Patent
Ai et al.

(10) Patent No.: US 12,780,335 B2
(45) Date of Patent: Nov. 3, 2026

(54) DIMPLED TRACK LINK

(71) Applicant: Caterpillar Inc., Peoria, IL (US)

(72) Inventors: Baojie Ai, Tianjin (CN); William Baar, Peoria, IL (US); Fuquan Zu, Tianjin (CN)

(73) Assignee: Caterpillar Inc., Peoria, IL (US)

( * ) Notice: Subject to any disclaimer, the term of this patent is extended or adjusted under 35 U.S.C. 154(b) by 266 days.

(21) Appl. No.: 18/630,235

(22) Filed: Apr. 9, 2024

(65) Prior Publication Data

US 2025/0313288 A1 Oct. 9, 2025

(51) Int. Cl.
*B62D 55/21* (2006.01)

(52) U.S. Cl.
CPC .................................... *B62D 55/21* (2013.01)

(58) Field of Classification Search
CPC .............................. B62D 55/21; B62D 55/213
See application file for complete search history.

(56) References Cited

U.S. PATENT DOCUMENTS 6,322,173 B1 * 11/2001 Maguire ................ B62D 55/21 305/201
6,354,679 B1 * 3/2002 Maguire ................ B62D 55/21 305/201
6,371,577 B1 * 4/2002 Hasselbusch .......... B62D 55/08 305/202
6,382,742 B1 * 5/2002 Hasselbusch ........ B62D 55/202 305/202
6,386,651 B1 5/2002 Gerardin et al.
6,783,196 B2 8/2004 Maguire et al.
7,614,709 B2 11/2009 Oertley
9,505,455 B1 * 11/2016 Brooks .................. B62D 55/21
10,065,692 B2 * 9/2018 Brooks .................. B62D 55/21
10,960,944 B2 * 3/2021 Jones ..................... B62D 55/26
2015/0266527 A1 9/2015 Akinlua et al.
2019/0351959 A1 * 11/2019 Trone ..................... B62D 55/21
2022/0340218 A1 10/2022 Vipond et al.

FOREIGN PATENT DOCUMENTS

DE 112015006147 T5 * 11/2017 ............. B21J 5/027
FR 1140006 A * 7/1957
JP 2004249797 9/2004
WO 2007108486 A1 9/2007

OTHER PUBLICATIONS

Written Opinion and International Search Report for Int'l. Patent Appln. No. PCT/US2025/022698, mailed Jun. 26, 2025 (21 pgs).

* cited by examiner

*Primary Examiner* — Adam D Rogers

(57) ABSTRACT

A track link may include two end portions including a pin bore and a bushing bore, both the pin bore and the bushing bore extending between an inner surface and an outer surface of the track link, and a central portion, in between the two end portions. The central portion may include a strut extending at least partially along a central axis of the central portion of the track link, at least two windows extending between the outer surface and the inner surface of the track link, each window being defined in part by the strut, and a dimple on at least one of the outer surface and inner surface, the dimple being located along the central axis of the central portion of the track link and in between the at least two windows.

20 Claims, 7 Drawing Sheets

DIMPLED TRACK LINK

TECHNICAL FIELD

The present disclosure relates generally to a track link for a track assembly of a machine, and, more particularly, to a track link having a material-reducing dimple.

BACKGROUND

Track assemblies of a track type machine, such as a dozer, a hydraulic excavator (HEX), or a track-type tractor, include a loop of link assemblies that support a loop of track shoes as the loop rotates around a sprocket and an idler assembly. Each link assembly includes a pair of track links mounted to a bushing, at a front end, and a pin, at a back end. Each link assembly is pivotably connected to adjacent link assemblies, in the loop, using bushings and pins. Track shoes are attached to each link assembly using bolts and nuts. Typically, track links are forged into relatively complex three-dimensional shapes, or they are formed by multiple pieces that are welded together. In either case, manufacturing track links can be costly due to the complexity of the final product, and the time and material required to form the final product. Forging may also result in relatively high waste of material due to complex shapes of the track link, or due to the need to use relatively larger billets to ensure the track links have a consistent cross-sectional area. That is, for a track link with a conventional profile, a maximum cross-sectional area from an end with a pin bore to an end with a bushing bore is at a location of a strut between the pin bore and the bushing bore. The billet size is determined based on the maximum cross-sectional area, and is relatively large due to the design of convention track links. In addition, during operation of the track type machine, stresses, such as compressive, tensile, and torsional stresses, may act on track links, and as a result, track links are susceptible to deformation or failure at low-strength areas of the track link.

U.S. Pat. No. 6,386,651 B1 (the '651 patent) provides for a track link that is formed to have a body member with planar sides, apertures that receive bushings and track pins, and one exit hole, in the case of a strutless design, or two exit holes. The track link described in the '651 patent has planar contact surfaces to facilitate the ability of a track link to be appropriately located during a link manufacturing processes, track chain assembly processes, and track chain disassembly processes. The track link of the '651 patent purports to eliminate the need to have structurally distinct right hand links and left hand links and thereby simplify and reduce the manufacturing cost of a track chain assembly. Track links formed from relatively less material (e.g., from billets having relatively smaller diameters), and/or with relatively lower manufacturing costs, as compared to those of the '651 patent, are desired for optimization of design and minimization of costs.

The track link, and related track link assembly and method of manufacture, of the present disclosure may solve one or more of the problems set forth above and/or other problems in the art. The scope of the current disclosure, however, is defined by the attached claims, and not by the ability to solve any specific problem.

SUMMARY

In one aspect of the present disclosure, a track link may comprise two end portions including a pin bore and a bushing bore, both the pin bore and the bushing bore extending between an inner surface and an outer surface of the track link; and a central portion, in between the two end portions, the central portion including: a strut extending at least partially along a central axis of the central portion of the track link; at least two windows extending between the outer surface and the inner surface of the track link, each window being defined in part by the strut; and a dimple on at least one of the outer surface and inner surface of the track link, the dimple being located along the central axis of the central portion of the track link and in between the at least two windows.

In another aspect, a track link may comprise two end portions including a pin bore and a bushing bore, both the pin bore and the bushing bore extending between an inner surface and an outer surface of the track link; and a central portion, in between the two end portions, the central portion including: a plurality of struts, at least one strut of the plurality of struts extending along a central axis of the central portion of the track link; at least two windows extending between the outer surface and the inner surface of the track link, each window being defined in part by at least one strut of the plurality of struts, and a central opening extending between the outer surface and the inner surface of the track link, the central opening being located along the central axis of the central portion of the track link and in between the at least two windows, and being defined in part by at least two struts of the plurality of struts.

In still another aspect, a method of manufacturing one or more track links may comprise forging a cylindrical billet of a predetermined diameter into a blank including: two end portions; a central portion in between the two end portions; and a dimple on an outer surface of the track link, the dimple being located along a central axis of the central portion; and punching a plurality of openings into the forged blank, the plurality of openings including at least two windows extending between an outer surface and an inner surface of the blank, thereby forming a strut extending at least partially along a central axis of the central portion of the blank, wherein the dimple is located in between the at least two windows.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion, such that a process, method, article, or apparatus that comprises a list of elements does not include only those elements, but may include other elements not expressly listed or inherent to such a process, method, article, or apparatus. Moreover, in this disclosure, relative terms, such as, for example, "about," "generally, "substantially," and "approximately" are used to indicate a possible variation of ±10% in the stated value.

Figure 1:
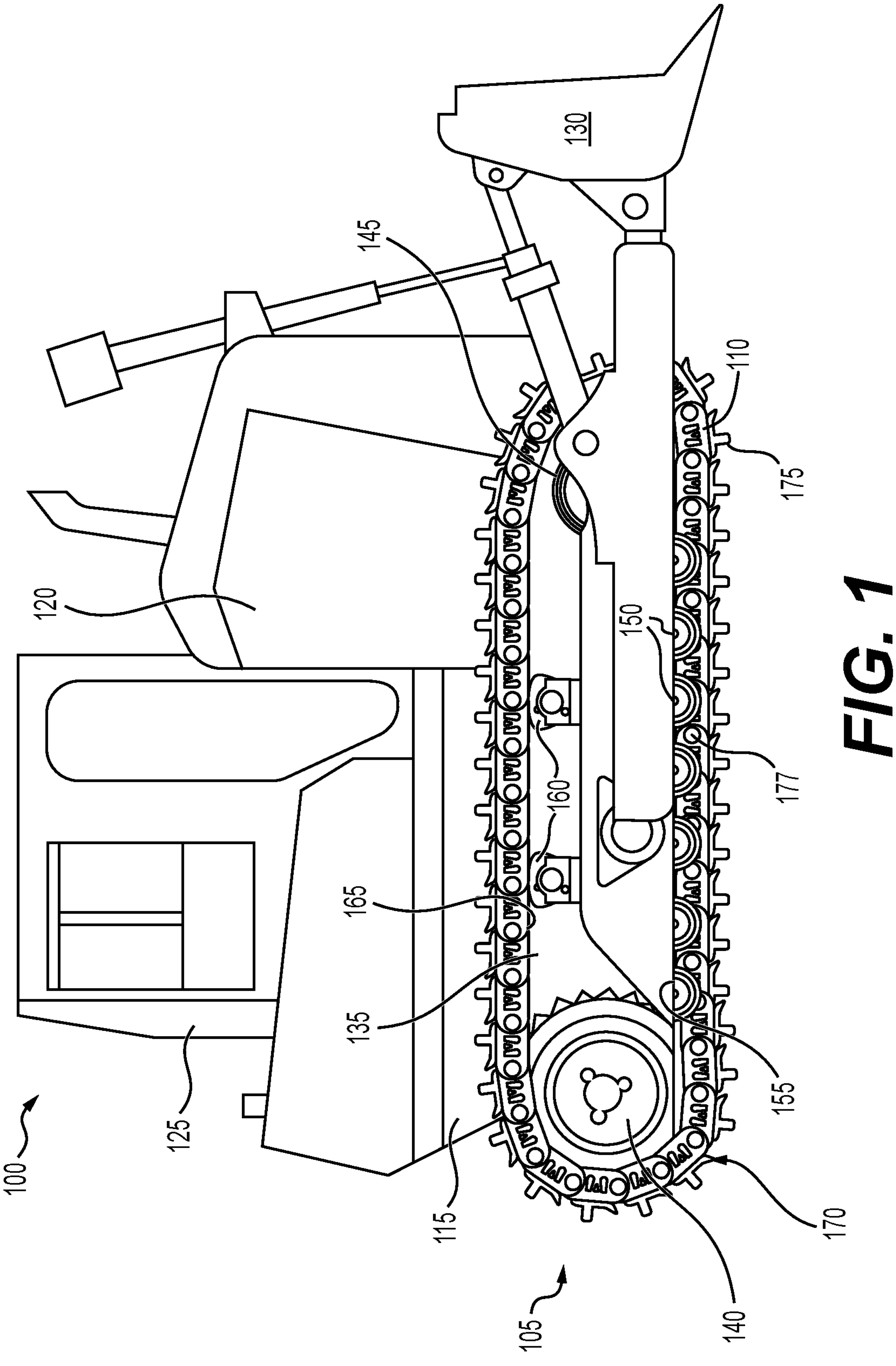
FIG. 1 shows a schematic side view of a dozer, as an example of a track type machine, having track link assemblies including a track link, in accordance with the present disclosure.

FIG. 1 shows a schematic side view of a track type machine 100 having two track assemblies 105, with a track assembly 105 on one side of the machine 100 being shown in FIG. 1. Each track assembly 105 includes track links 110 in accordance with the present disclosure. The machine 100 includes a machine frame 115, supporting an engine 120, an operator station 125, and a work tool or implement 130. The machine 100 also includes a track support frame 135, provided as part of the undercarriage of the machine frame 115. The track support frame 135 supports the track assemblies 105, the work tool 130, a sprocket 140, and an idler assembly 145. Each track assembly 105 includes lower track support assemblies 150, provided on a lower surface 155 of the track support frame 135, and upper track support assemblies 160, provided on an upper surface 165 of the track support frame 135. In addition, each track assembly 105 includes track link assemblies 170 in a loop extending around the lower track support assemblies 150 and the upper track support assemblies 160. Each track link assembly 170 includes a pair of track links 110 and track shoes 175. Track link assemblies 170 are connected to each other using a pin and bushing assembly 177, thereby forming a loop of track link assemblies. During operation, the engine 120 may generate a power output directed through the sprocket 140, to move the track shoes 175, and thereby propel the machine 100 forwards or backwards.

Figure 2:
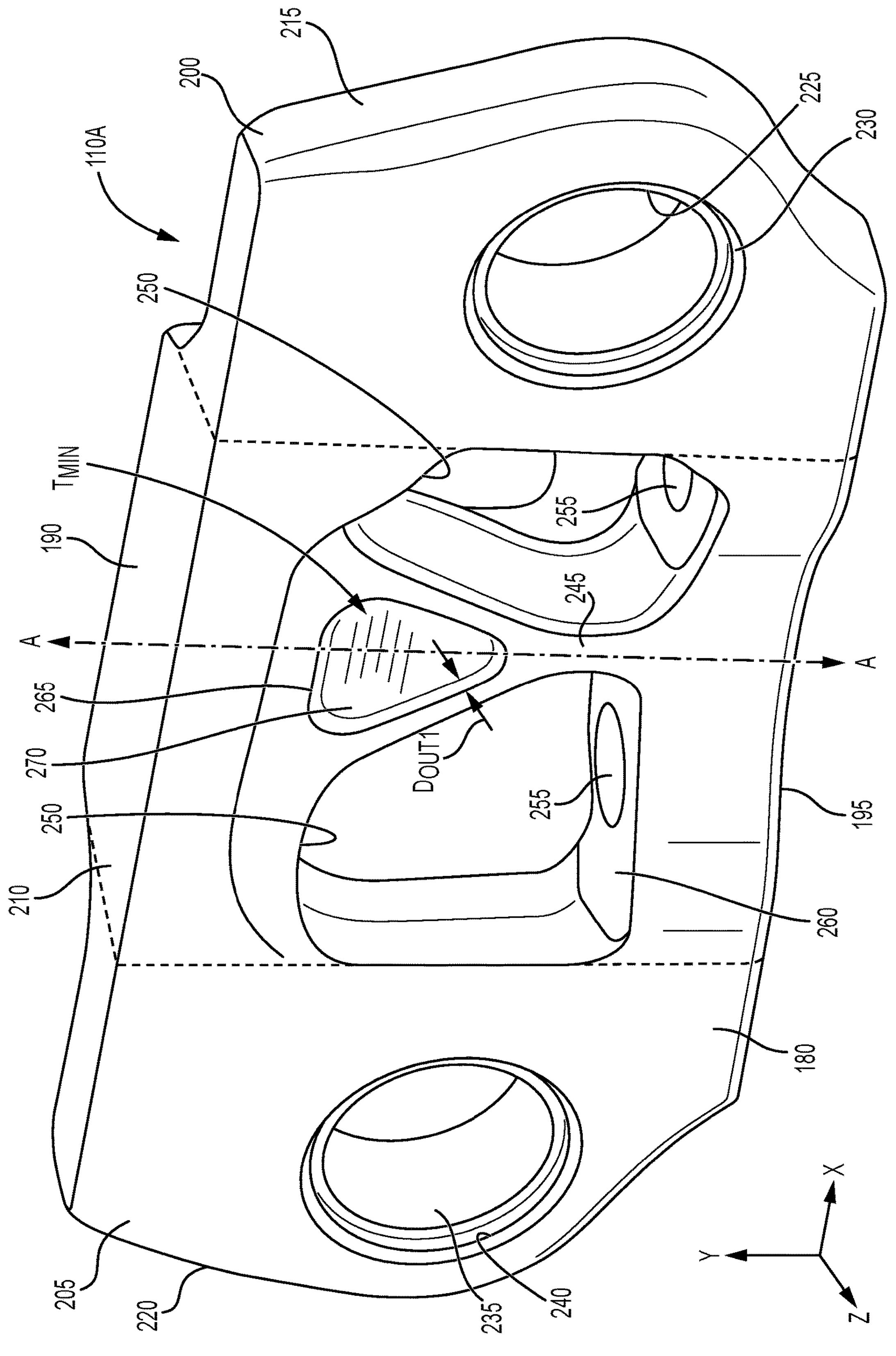
FIG. 2 shows a schematic isometric view of a track link according to a first embodiment, in accordance with the present disclosure.

FIG. 2 shows a schematic isometric view of a track link 110A according to a first embodiment. The track link 110A has an outer surface 180, configured to face outward from the machine 100 when installed within a track assembly 105, and an inner surface 185 (shown in FIG. 3), configured to face inward toward the other track assembly 105, when installed within the track assembly 105. In addition, the track link 110A includes an upper surface 190, or a rail side, configured to contact the lower track support assemblies 150 and the upper track support assemblies 160 when installed within the track link assembly 170, and a lower surface 195, or a shoe side, configured to contact the track shoes 175 when installed within the track link assembly 170. Further, the track link includes two end portions, namely, a front portion 200 and a back portion 205, and a central portion 210 in between the front portion 200 and the back portion 205.

The front portion 200 of the track link 110A includes a front surface 215, and the back portion 205 of the track link includes a back surface 220. The front portion 200 may include a pin bore 225, extending between the outer surface 180 and the inner surface 185, and a pin counter bore 230, coinciding with the pin bore 225, near the outer surface 180. The back portion 205 may include a bushing bore 235, extending between the outer surface 180 and the inner surface 185, and a bushing counter bore 240, coinciding with the bushing bore 235, near the outer surface 180. Edges of one or more of the pin bore 225, the pin counter bore 230, the bushing bore 235, and the bushing counter bore 240 may be chamfered. The chamfered edges may be rounded. On the front portion 200 and the back portion 205, the outer surface 180, the upper surface 190, and the lower surface 195 may be generally planar.

The central portion 210 of the track link 110A includes a strut 245 extending a least partially along a central axis A-A of the central portion 210, parallel to the y-axis shown in FIG. 2. On each side of the strut 245, a window 250 extends through the central portion 210 between the outer surface 180 and the inner surface 185 of the track link 110A. Each window 250 is defined, in part, by the strut 245. The track link 110A may also include bolt holes 255, extending through the central portion 210 in a direction that is parallel to the y-axis (and perpendicular to the direction in which the windows 250, the pin bore 225, and the bushing bore 235 extend), and intersecting the windows 250. That is, the bolt holes 255 extend between an inner surface 260 of the windows 250 to the lower surface 195 of the track link 110A. The bolt holes 255 are configured to receive bolts and nuts (not shown) for connecting a track shoe 175 to the track link 110A.

In addition, the central portion 210 includes an outer dimple 265, the track link 110A having a minimum thickness $T_{MIN}$ along a z-axis at the location of the outer dimple 265. The outer dimple 265 is located on the outer surface 180 of the track link 110A, in between the windows 250, and may align with the central axis A-A and, therefore, with the strut 245. The outer dimple 265 may have a depth $D_{OUT1}$, defined as a distance between the outer surface 180 of the track link 110A and an outer surface 270 of the outer dimple 265. In the embodiment shown in FIG. 2, the outer dimple 265 is generally triangular in shape, with a side of the triangle at an upper end of the outer dimple 265 and a point of the triangle at the lower end of the outer dimple 265. The outer dimple 265 may, however, have other shapes (e.g., circular, rectangular, square, etc.) and/or orientations. In the embodiment shown in FIG. 2, the outer dimple 265 is located closer to the upper surface 190 than to the lower surface 195 of the track link 110A. In other embodiments, however, the outer dimple 265 may be located closer to the lower surface 195 than to the upper surface 190, or the outer dimple 265 may be centered between the upper surface 190 and the lower surface 195 of the track link 110A.

Figure 3:
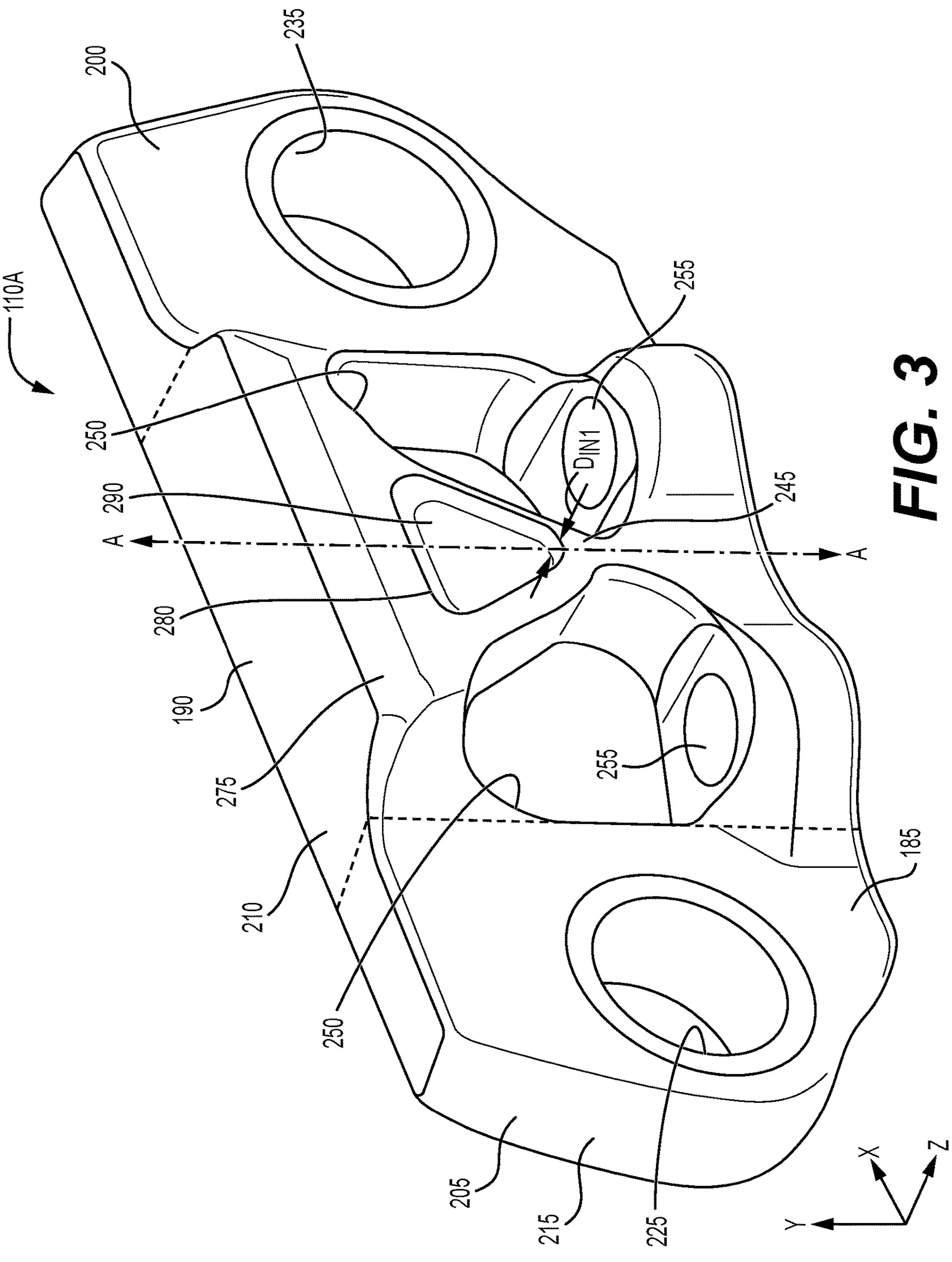
FIG. 3 shows another schematic isometric view of the track link shown in FIG. 2, in accordance with the present disclosure.

FIG. 3 shows another schematic isometric view of the track link 110A shown in FIG. 2. In particular, FIG. 3 shows the inner surface 185 of the track link 110A, as well as the upper surface 190 of the track link 110A, the front portion 200, the back portion 205, and the central portion 210. The pin bore 225 and the bushing bore 235 are shown in the front portion 200 and the back portion 205, respectively. FIG. 3 also shows the strut 245, the windows 250, and the bolt holes 255 in the central portion 210. The track link 110A may also include a protrusion 275 extending along the inner surface 185 and the upper surface 190 in the central portion 210, as shown in FIG. 3. The protrusion 275 may provide additional surface area for contact between the track link 110A and the lower track support assemblies 150 and the upper track support assemblies 160 of the track assembly 105.

Further, FIG. 3 shows an inner dimple 280, located in the inner surface 185 of the track link 110A, in a location opposite to the outer dimple 265, in between the windows 250, and aligning with the central axis A-A and the strut 245. The inner dimple 280 may have a depth $D_{IN1}$, defined as a distance between the inner surface 185 of the track link 110A and an inner surface 290 of the inner dimple 280. In the embodiment shown in FIG. 3, the inner dimple 280 is generally triangular in shape, with a side of the triangle at an upper end of the inner dimple 280 and a point of the triangle at the lower end of the inner dimple 280. The inner dimple 280 may, however, have other shapes (e.g., circular, rectangular, square, etc.) and/or orientations. In addition, the inner dimple 280 may have the same shape as that of the outer dimple 265, however, in some embodiments, the inner dimple 280 may have a different shape as that of the outer dimple 265. In the embodiment shown in FIG. 3, the inner dimple 280 is located closer to the upper surface 190 than to the lower surface 195 of the track link 110A. In other embodiments, however, the inner dimple 280 may be located closer to the lower surface 195 than to the lower surface 195, or the inner dimple 280 may be centered between the upper surface 190 and the lower surface 195 of the track link 110A.

In some embodiments, the depth $D_{IN1}$ of the inner dimple 280 may be greater than the depth $D_{OUT1}$ of the outer dimple 265. In other embodiments, the depth $D_{IN1}$ of the inner dimple 280 may be less than the depth $D_{OUT1}$ of the outer dimple 265. In still other embodiments, the depth $D_{IN1}$ of the inner dimple 280 may be equal to the depth $D_{OUT1}$ of the outer dimple 265. Further, although FIGS. 2 and 3 show a track link 110A including the outer dimple 265 and the inner dimple 280, in some embodiments, the track link 110A may include only the outer simple 265 and not the inner dimple 280, and in still other embodiments, the track link 110A may include only the inner dimple 280 and not the outer dimple 265.

Figure 4:
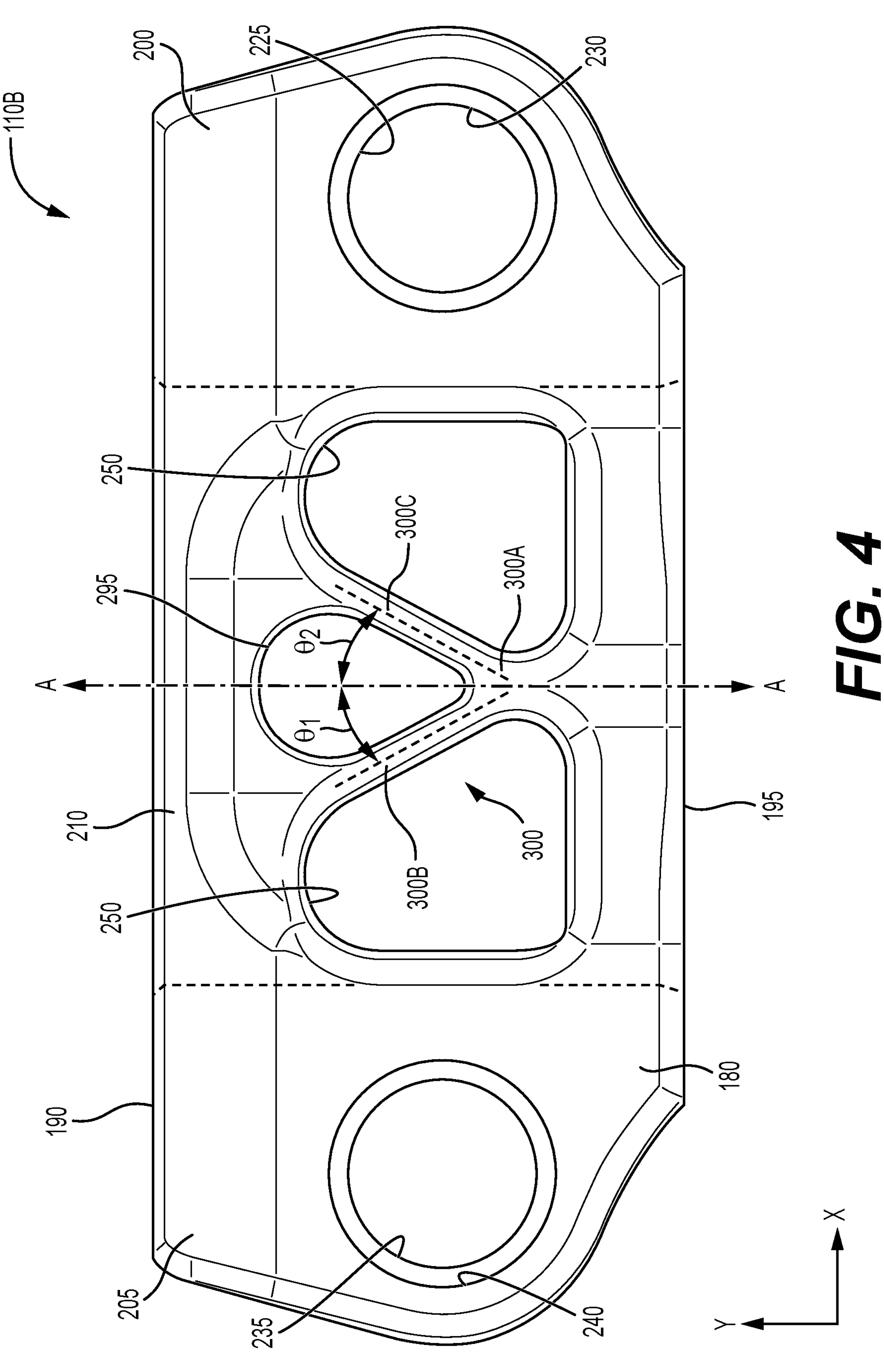
FIG. 4 shows a schematic side view of a track link according to a second embodiment, in accordance with the present disclosure.

FIG. 4 shows a schematic side view of a track link 110B according to a second embodiment. The track link 110B of the second embodiment is generally the same as the track link 110A of the first embodiment, in that is includes a front portion 200, a back portion 205, and a central portion 210, an outer surface 180 and an inner surface 185 (not shown), as well as a pin bore 225 and a pin counter bore 230 in the front portion 200, a bushing bore 235 and bushing counter bore 240 in the back portion 205, and two windows 250 and two bolts holes 255 (not shown) within the central portion 210. The track link 110B of this embodiment differs from that of the first embodiment, in that instead of having an outer dimple 265 and an inner dimple 280, the track link 110B includes a central opening 295. The central opening 295 is located in between the windows 250, and aligns with the central axis A-A. In the embodiment shown in FIG. 4, the central opening 295 may have a teardrop shape, including a point at the lower end of the central opening 295 and a curved side opposite from the point. The central opening 295 may, however, have other shapes (e.g., triangular, circular, rectangular, square, etc.) and/or orientations. In the embodiment shown in FIG. 4, the central opening 295 is located closer to the upper surface 190 than to the lower surface 195 of the track link 110B. In other embodiments, however, the central opening 295 may be located closer to the lower surface 195 than to the upper surface 190, or the central opening 295 may be centered between the upper surface 190 and the lower surface 195 of the track link 110B.

The track link 110B of this embodiment also differs from that of the first embodiment in that it includes a plurality of struts 300, including a central, lower strut 300A that is aligned with or extending along the central axis A-A. In the embodiment shown in FIG. 4, the track link 110B includes three struts 300, with the lower, centrally-aligned strut 300A and two upper struts 300B and 300C that extend at angles $\theta_1$ and $\theta_2$ relative to the central axis A-A. In one embodiment, the angles $\theta_1$ and $\theta_2$ are equal, however, in another embodiment, $\theta_1$ and $\theta_2$ are different from each other. The struts 300 define the windows 250 and the central opening 295.

Figure 5:
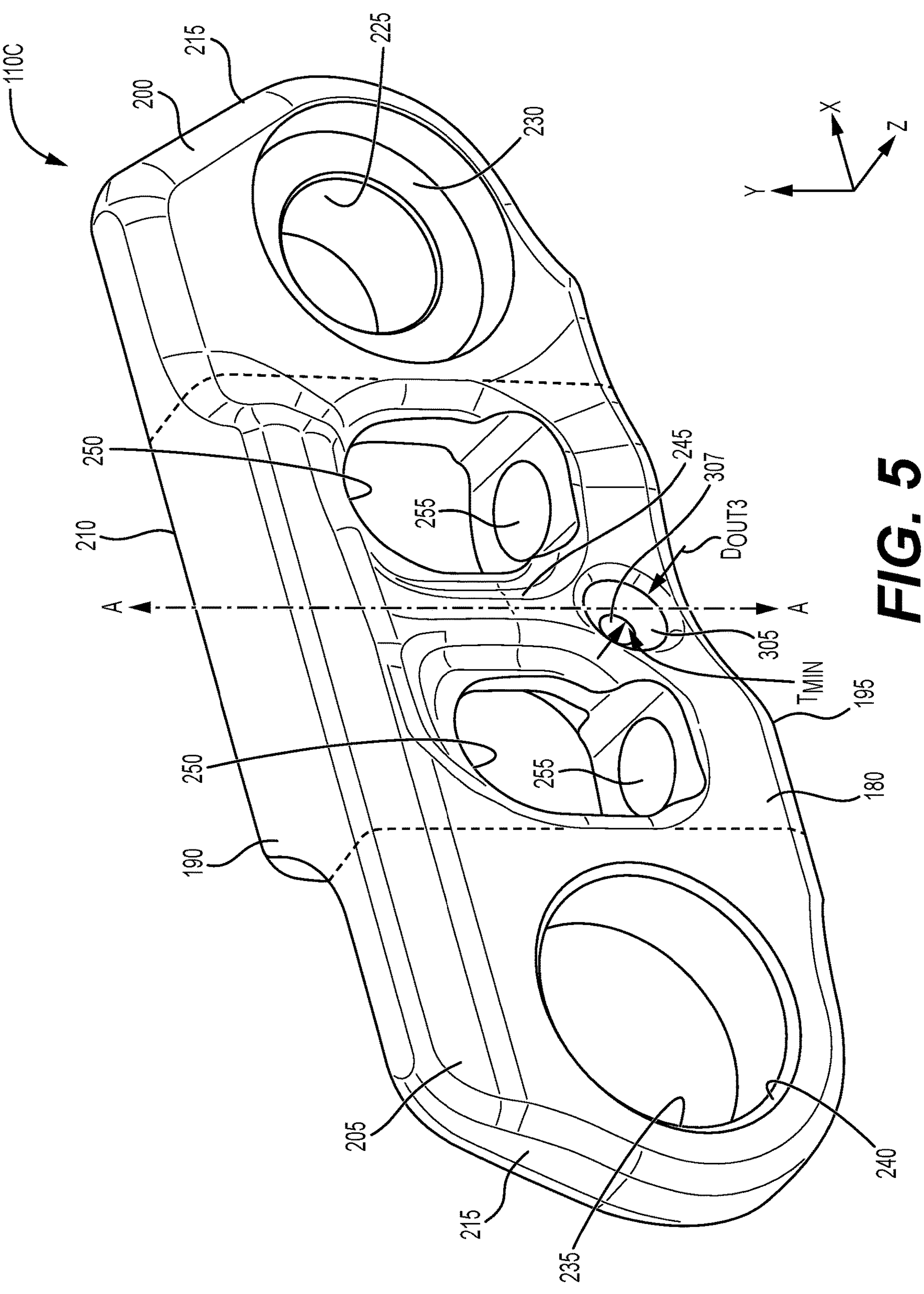
FIG. 5 shows a schematic isometric view of a track link according to a third embodiment, in accordance with the present disclosure.

FIG. 5 shows a schematic isometric view of a track link 110C according to a third embodiment. The track link 110C of the third embodiment is generally the same as the track link 110A of the first embodiment, in that it includes a front portion 200, a back portion 205, and a central portion 210, an outer surface 180 and an inner surface 185 (shown in FIG. 6), as well as a pin bore 225 and a pin counter bore 230 in the front portion 200, a bushing bore 235 and bushing counter bore 240 in the back portion 205, a strut 245, and two windows 250 and two bolts holes 255 within the central portion 210. The track link 110C has an outer dimple 305, the track link 110C having a minimum thickness $T_{MIN}$ along a z-axis at the location of the outer dimple 305. The outer dimple 305 is located on the outer surface 180 of the track link 110C, in between the windows 250, and may align with the central axis A-A and, therefore, with the strut 245. The outer dimple 305 may have a depth $D_{OUT3}$, defined as a distance between the outer surface 180 of the track link 110C and an outer surface 307 of the outer dimple 305. In the embodiment shown in FIG. 5, the outer dimple 305 is circular in shape. The outer dimple 305 may, however, have other shapes (e.g., triangular, rectangular, square, etc.) and/or orientations. In the embodiment shown in FIG. 5, the outer dimple 305 is located closer to the lower surface 195 than to the upper surface 190 of the track link 110C. In other embodiments, however, the outer dimple 305 may be located closer to the upper surface 190 than to the lower surface 195, or the outer dimple 305 may be centered between the upper surface 190 and the lower surface 195 of the track link 110C.

Figure 6:
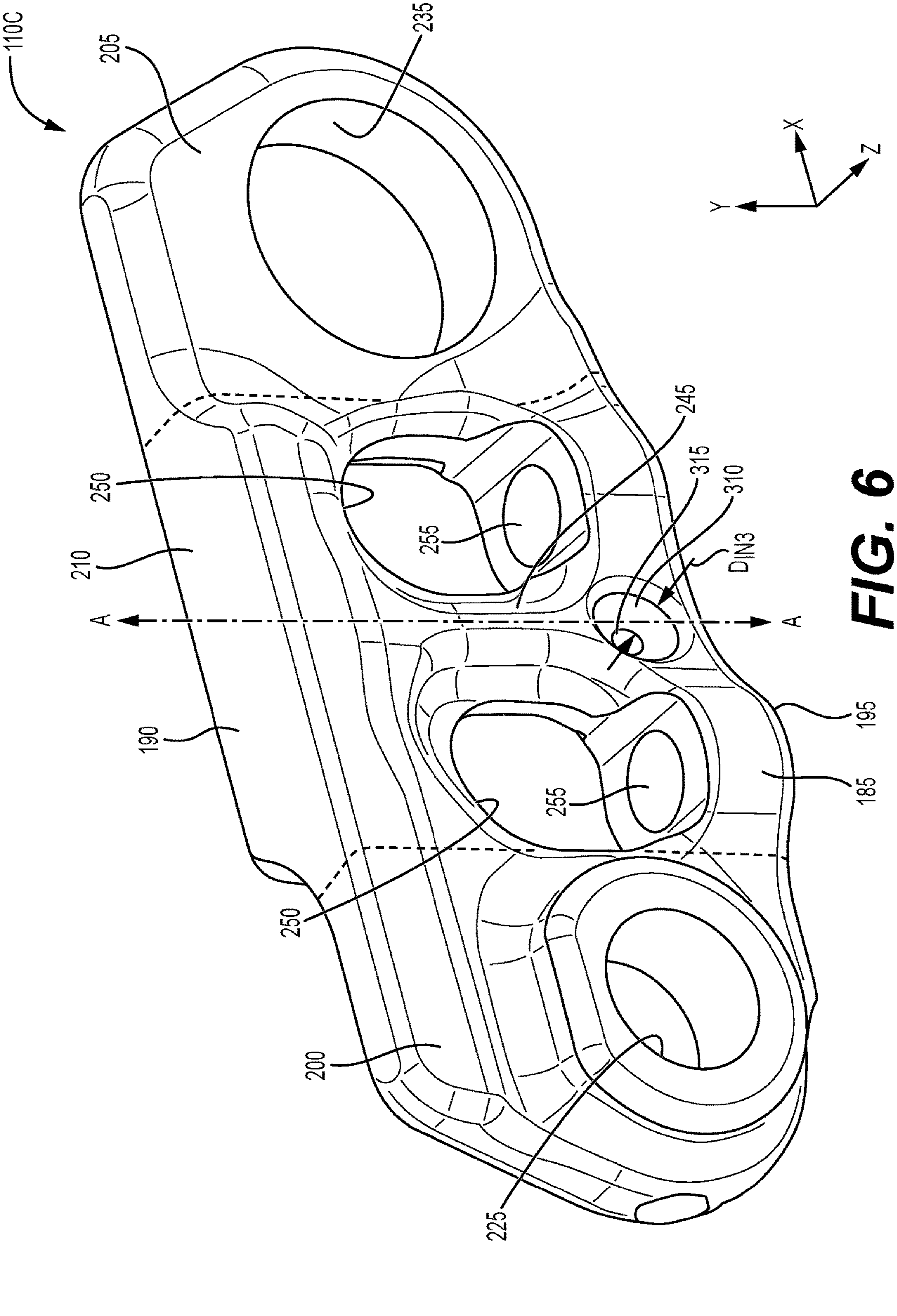
FIG. 6 shows another schematic isometric view of the track link shown in FIG. 5, in accordance with the present disclosure.

The track link 110C of the third embodiment also differs in that the shapes of the windows 250 are varied from those of the first and second embodiment, and a length and a width of the strut 245 are relatively greater than those of the first embodiment. In addition, the portion of the outer surface 180 on the front portion 200 of the track link 110C is recessed compared to the portion of the outer surface 180 on the back portion 205 and the central portion 210, as shown in FIG. 5. And, as shown in FIG. 6, the portion of the inner surface 185 of the back portion 205 of the track link 110C is recessed compared to the portion of the inner surface 185 on the front portion 200 and the central portion 210. A shape of the upper surface 190 of the track link 110C is defined by the so varied outer surface 180 and inner surface 185 of the track link 110C, with a relatively thicker portion along the central portion 210 of the track link 110C, and relatively thinner portions along the front portion 200 and the back portion 205 of the track link 110C. The relatively thick portion along the central portion 210 of the track link 110C may provide additional surface area for contact between the track link 110C and the lower track support assemblies 150 and the upper track support assemblies 160 of the track assembly 105.

FIG. 6 shows another schematic isometric view of the track link 110C shown in FIG. 5. In particular, FIG. 6 shows the inner surface 185 of the track link 110C, as well as the upper surface 190 of the track link 110C, the front portion 200, the back portion 205, and the central portion 210. The pin bore 225 and the bushing bore 235 are shown in the front portion 200 and the back portion 205, respectively. FIG. 6 also shows the strut 245, the windows 250, and the bolt holes 255 in the central portion.

Further, FIG. 6 shows an inner dimple 310, located in the inner surface 185 of the track link 110C, in a location opposite to the outer dimple 305, in between the windows 250, and aligning with the central axis A-A and the strut 245. The inner dimple 310 may have a depth $D_{IN3}$, defined as a distance between the inner surface 185 of the track link 110C and an inner surface 315 of the inner dimple 310. In the embodiment shown in FIG. 6, the inner dimple 310 is circular in shape. The inner dimple 310 may, however, have other shapes (e.g., triangular, rectangular, square, etc.) and/or orientations. In addition, the inner dimple 310 may have the same shape as that of the outer dimple 305, however, in some embodiments, the inner dimple 310 may have a different shape as that of the outer dimple 305. In the embodiment shown in FIG. 6, the inner dimple 310 is located closer to the lower surface 195 than to the upper surface 190 of the track link 110C. In other embodiments, however, the inner dimple 310 may be located closer to the upper surface 190 than to the lower surface 195, or the inner dimple 310 may be centered between the upper surface 190 and the lower surface 195 of the track link 110C.

In some embodiments, the depth $D_{IN3}$ of the inner dimple 310 may be greater than the depth $D_{OUT3}$ of the outer dimple. In other embodiments, the depth $D_{IN3}$ of the inner dimple 310 may be less than the depth $D_{OUT3}$ of the outer dimple 305. In still other embodiments, the depth $D_{IN3}$ of the inner dimple 310 may be equal to the depth $D_{OUT3}$ of the outer dimple 305. Further, although FIGS. 5 and 6 show a track link 110C including the outer dimple 305 and the inner dimple 310, in some embodiments, the track link 110C may include only the outer simple 305 and not the inner dimple 310, and in still other embodiments, the track link 110C may include only the inner dimple 310 and not the outer dimple 305.

INDUSTRIAL APPLICABILITY

The track links 110 of the present disclosure, and the related method of manufacture described below, can be used in track type machines 100, such as dozers, hydraulic excavators (HEXs), or track-type tractors. Specifically, track links 110 of the present disclosure can be used as part of a loop of track link assemblies 170 that support a loop of track shoes 175, and, as the loop rotates around a sprocket 140 and an idler assembly 145, the track shoes 175 engage with a surface (terrain), to move the machine 100 forwards or backwards.

Figure 7:
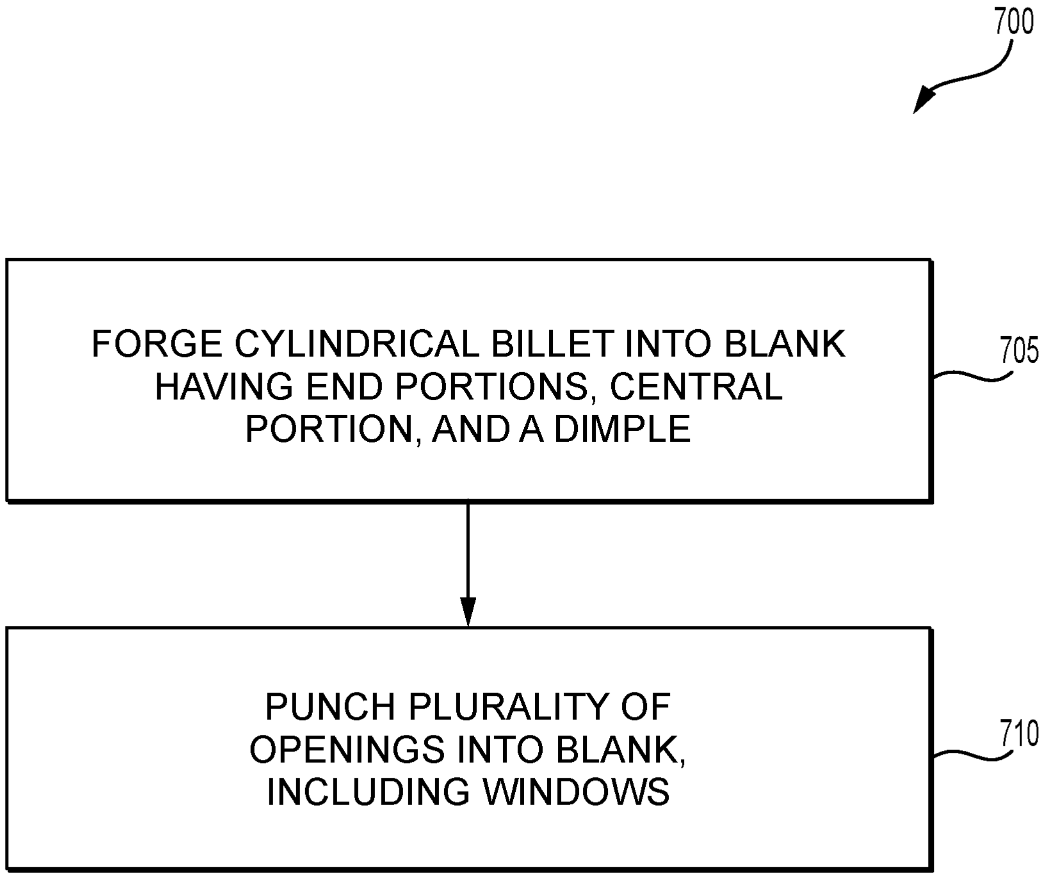
FIG. 7 shows a flow chart of a method of manufacturing a track link, in accordance with the present disclosure.

FIG. 7 shows a flow chart of a method 700 of manufacturing a track link 110, in accordance with the present disclosure. The method 700 may include a step 705 of forging a cylindrical billet of a predetermined diameter into a blank, including two end portions 200, 205 and a central portion 210 in between the two end portions 200, 205. The blank also includes a dimple on an outer surface 180, for example, outer dimple 265, which is located along a central axis of the central portion. Forging may include heating the cylindrical billet to a predetermined temperature, and smashing the heated billet in a die to form the blank. The method 700 may further include trimming or punching a plurality of openings into the forged blank. The plurality of openings include at least two windows 250, which extend between an outer surface 180 and an inner surface 185 of the blank and in punching the windows 250, a strut 245 is thereby formed which extends at least partially along a central axis A-A of the central portion 210 of the blank. The dimple 265 is located between the at least two windows 250.

Although the method 700 is described as including the steps described above, and shown in FIG. 7, the method 700 may include additional steps and/or substeps. For example, the forging step 705 may include forming the dimple 265 in a predetermined shape, e.g., a triangle, a circle, a square, etc. In addition, the forging step 705 may include forming the dimple 265 in a location that is closer to an upper surface 190 than to a lower surface 195 of the track link 110, or forming the dimple 265 in a location that is closer to the lower surface 195 than to the upper surface 190. Further, the forging step 705 may include forming the outer dimple 265 and forming an inner dimple 280 on the inner surface 185 of the blank, opposite to the outer dimple 265. As described above, in one embodiment, a depth $D_{IN1}$ of the inner dimple 280 may be greater than a depth $D_{OUT1}$ of the outer dimple 265. In another embodiment, the depth $D_{IN1}$ of the inner dimple 280 may be less than the depth $D_{OUT1}$ of the outer dimple 265, or the depth $D_{IN1}$ of the inner dimple may be the same as the depth $D_{OUT1}$ of the outer dimple 265.

Further, the method 700 may include forming one or more additional features of the track link 110A of the first embodiment or the track link 110C of the third embodiment, described above with reference to FIGS. 2, 3, 5, and 6. For example, the method 700 may include a step of machining bolt holes 255 between the inner surface 260 of the windows 250 and the lower surface 195 of the track link 110. In addition, in an alternative embodiment, the method 700 may include, as part of the punching step, punching a central opening 295 into the blank, instead of forging a blank that includes a dimple 265. In this alternative embodiment, the track link 110 formed by this method may correspond to that of the second embodiment, described above with reference to FIG. 4. Further, the method 700 of the alternative embodiment may include forming one or more additional features of the track link 110B of the second embodiment.

By virtue of the track links 110 of the present disclosure, and the related method, it is possible to form a track link 110 using a relatively smaller billet, which, in turn, optimizes material usage (or reduces the amount of wasted material of a billet), and reduces the cost of manufacture. That is, a relatively smaller billet may be used to form the track links 110 of the present disclosure, as a maximum cross-sectional area is smaller than that of conventional link designs. In addition, the track links 110 and the related method provide for optimized strength of track links 110 formed in accordance with the present disclosure. More specifically, the track links 110 having one or more dimples and the track links 110 having central openings, in accordance with the present disclosure, have relatively lower weights by virtue of the removed material in forming the one or more dimples or the central opening, without comprising the strength of the track link 110. That is, the track links 110 and the related method of the present disclosure utilize material (e.g., a billet) more effectively without comprising the strength of the track links 110.

It will be apparent to those skilled in the art that various modifications and variations can be made to the disclosed track link and related method of manufacture, without departing from the scope of the disclosure. Other embodiments of the track link and method of manufacture will be apparent to those skilled in the art from consideration of the specification and the accompanying figures. It is intended that the specification, and, in particular, the examples provided herein be considered as exemplary only, with a true scope of the disclosure being indicated by the following claims and their equivalents.

The invention claimed is:

1. A track link comprising:

two end portions including a pin bore and a bushing bore, both the pin bore and the bushing bore extending between an inner surface and an outer surface of the track link; and a central portion, in between the two end portions, the central portion including:

a strut extending at least partially along a central axis of the central portion of the track link;

at least two windows extending between the outer surface and the inner surface of the track link, each window being defined in part by the strut; and a dimple on at least one of the outer surface or the inner surface of the track link, the dimple being located along the central axis of the central portion of the track link and in between the at least two windows;

wherein the dimple on the outer surface of the track link is an outer surface dimple, and wherein the central portion further includes an inner surface dimple, located on the inner surface of the track link, opposite to the outer surface dimple.

2. The track link according to claim 1, wherein the dimple is generally triangular in shape or generally circular in shape.

3. The track link according to claim 1, wherein the central portion further includes a rail side and a shoe side extending between the inner surface and the outer surface, the dimple being located closer to the rail side than to the shoe side.

4. The track link according to claim 1, wherein a depth of the inner surface dimple is greater than a depth of the outer surface dimple.

5. The track link according to claim 1, wherein the track link has a minimum thickness at the location of the dimple.

6. The track link according to claim 1, wherein the central portion further includes at least two bolt holes that are perpendicular to the pin bore and the bushing bore, each bolt hole intersecting a window, of the at least two windows.

7. A track link comprising:

two end portions including a pin bore and a bushing bore, both the pin bore and the bushing bore extending between an inner surface and an outer surface of the track link; and a central portion, in between the two end portions, the central portion including:

a strut extending at least partially along a central axis of the central portion of the track link;

at least two windows extending between the outer surface and the inner surface of the track link, each window being defined in part by the strut; and a dimple on at least one of the outer surface or the inner surface of the track link, the dimple being located along the central axis of the central portion of the track link and in between the at least two windows;

wherein the central portion further includes a rail side and a shoe side extending between the inner surface and the outer surface, the dimple being located closer to the rail side than to the shoe side.

8. The track link according to claim 7, wherein the dimple is generally triangular in shape or generally circular in shape.

9. A track link comprising:

two end portions including a pin bore and a bushing bore, both the pin bore and the bushing bore extending between an inner surface and an outer surface of the track link; and a central portion, in between the two end portions, the central portion including:

a plurality of struts, at least one strut of the plurality of struts extending along a central axis of the central portion of the track link;

at least two windows extending between the outer surface and the inner surface of the track link, each window being defined in part by at least one strut of the plurality of struts, and a central opening extending between the outer surface and the inner surface of the track link, the central opening being located along the central axis of the central portion of the track link and in between the at least two windows, and being defined in part by at least two struts of the plurality of struts.

10. The track link according to claim 9, wherein the central opening has a teardrop shape.

11. The track link according to claim 9, wherein the plurality of struts includes three struts.

12. The track link according to claim 9, wherein the central portion further includes a rail side and a shoe side extending between the inner surface and the outer surface, the central opening being located closer to the rail side than to the shoe side.

13. The track link according to claim 9, wherein the central portion further includes at least two bolt holes that are perpendicular to the pin bore and the bushing bore, each bolt hole intersecting a window, of the at least two windows.

14. A method of manufacturing one or more track links, the method comprising:

forging a cylindrical billet of a predetermined diameter into a blank including:

two end portions;

a central portion in between the two end portions; and a dimple on an outer surface of the blank, the dimple being located along a central axis of the central portion; and punching a plurality of openings into the forged blank, the plurality of openings including at least two windows extending between an outer surface and an inner surface of the blank, thereby forming a strut extending at least partially along the central axis of the central portion of the blank, wherein the dimple is located in between the at least two windows.

15. The method of claim 14, wherein the dimple is generally triangular in shape.

16. The method of claim 14, wherein the dimple is generally circular in shape.

17. The method of claim 14, wherein the central portion further includes a rail side and a shoe side extending between the inner surface and the outer surface, the dimple being formed closer to the rail side than to the shoe side.

18. The method of claim 14, wherein the dimple on the outer surface of the track link is an outer dimple, and wherein the blank formed by forging further includes an inner dimple, located on the inner surface of the track link, opposite to the outer dimple.

19. The method of claim 18, wherein a depth of the inner dimple is greater than a depth of the outer dimple.

20. The method of claim 18, wherein the track link has a minimum thickness at the location of the inner dimple and the outer dimple.

* * * * *